United States Patent Office 3,436,644
Patented Apr. 1, 1969

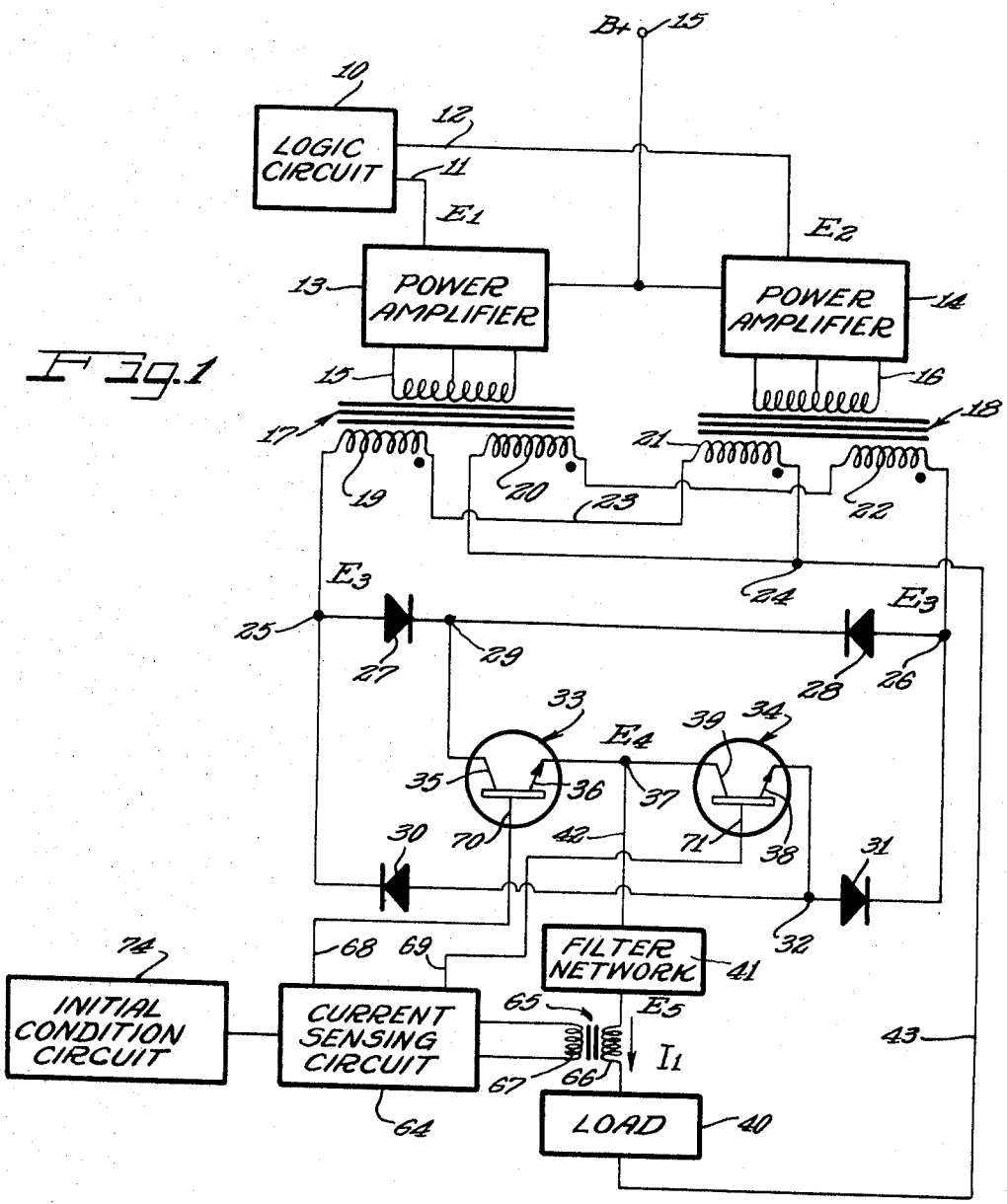

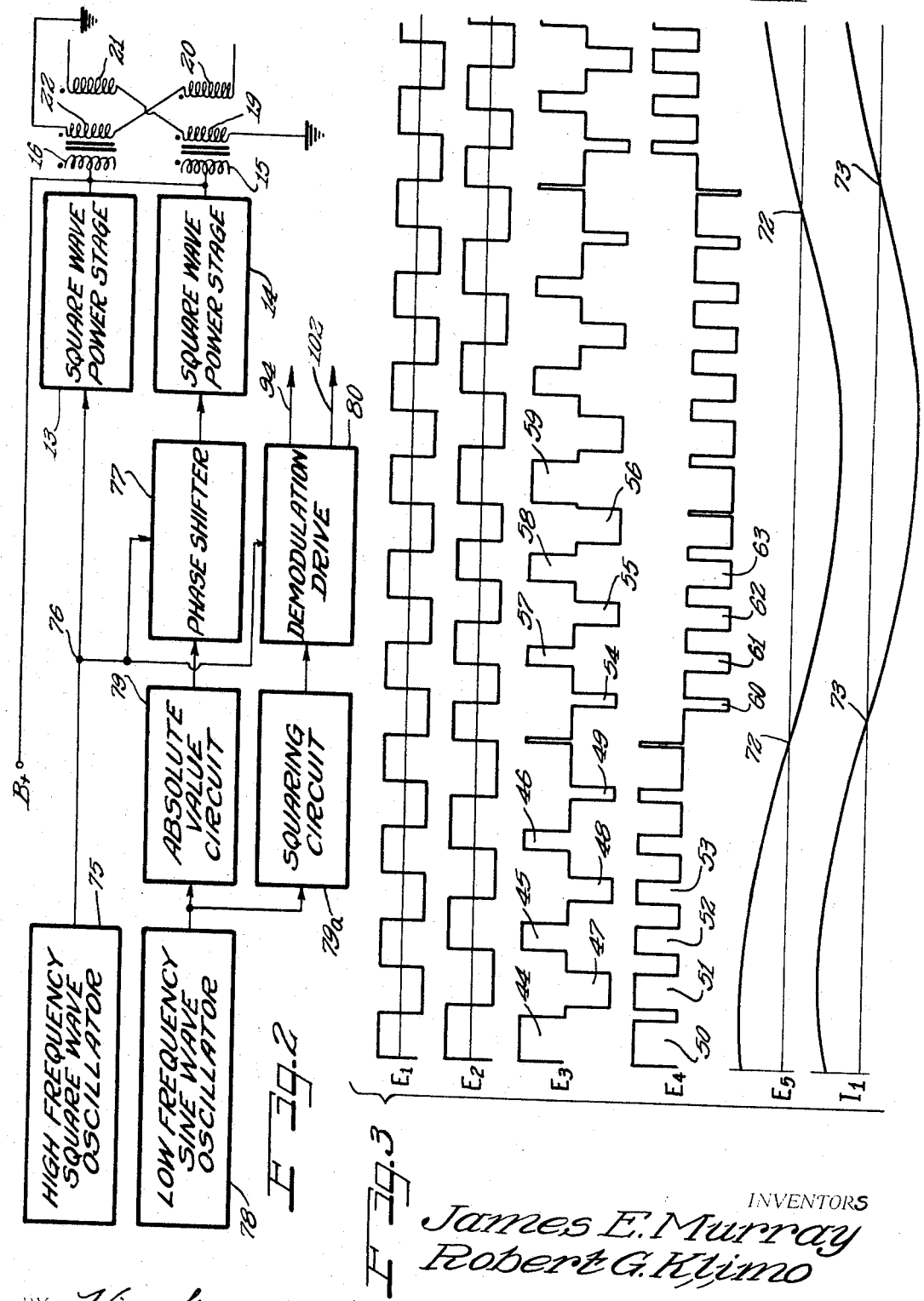

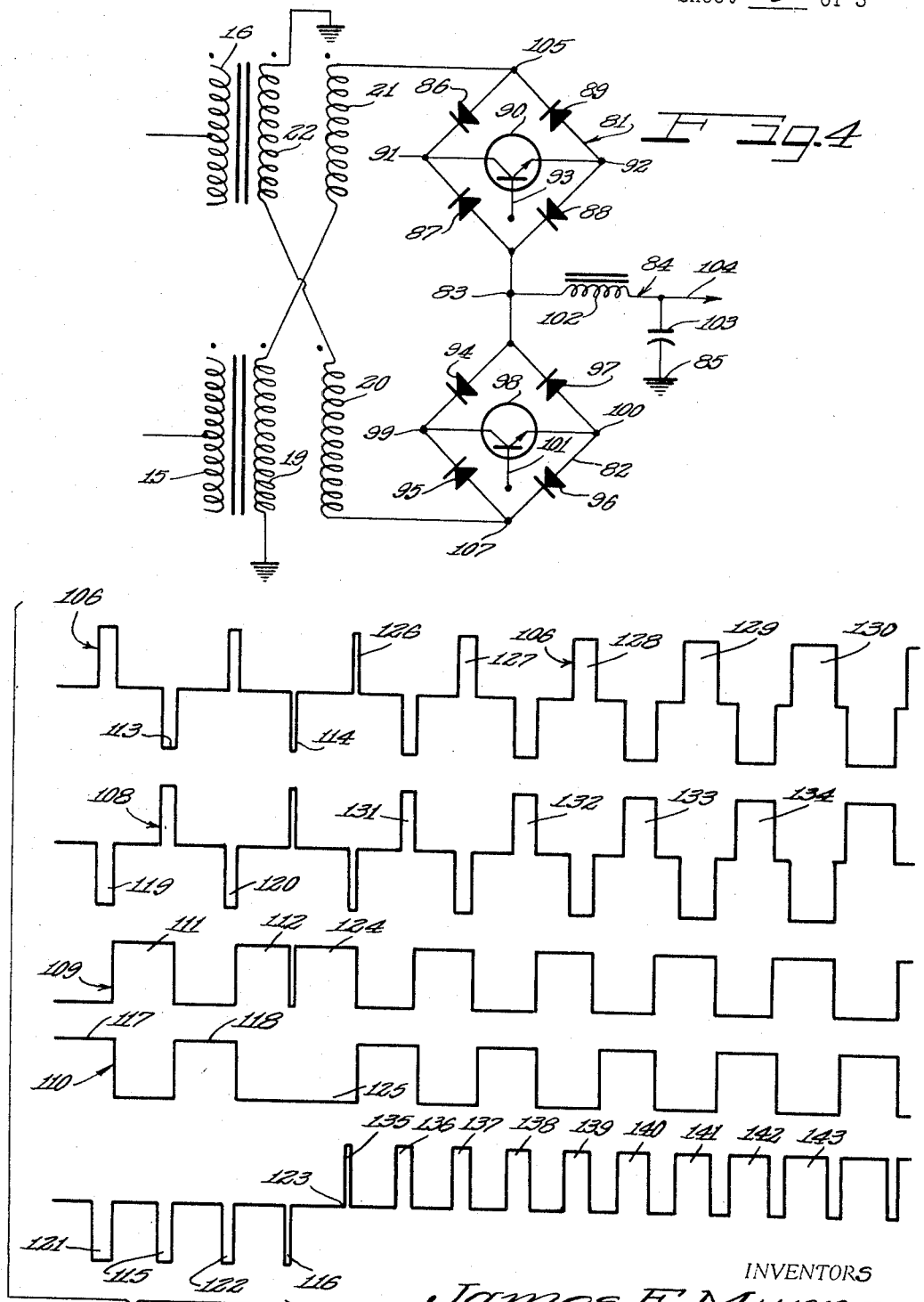

3,436,644
HIGH FREQUENCY MODULATED STATIC INVERTER
James E. Murray, University Heights, and Robert G. Klimo, Brooklyn, Ohio, assignors to TRW Inc., Cleveland, Ohio, a corporation of Ohio
Filed July 29, 1966, Ser. No. 568,947
Int. Cl. H02m 7/52
U.S. Cl. 321—18          13 Claims

ABSTRACT OF THE DISCLOSURE

A high frequency static inverter which has a high frequency source with an output which is divided into two paths with one path being phase shifted at a low frequency rate. The outputs of the two paths are supplied to transformers and a switching circuit to provide a high efficiency output.

---

This invention relates to a high frequency static inverter and in particular relates to a novel phase angle modulation static inverter having an improved and high efficient means for developing a high level AC signal from a low level DC input.

Most electrical equipment operates on AC power. This is either because AC power is the form of power which is most generally available and is therefore the most convenient or because the physics of the equipment involved requires AC power. However, in many circumstances, conventional AC power such as may be generated by heavy rotating land based equipment, is not available. Accordingly, in such circumstances means have been provided for converting a DC power source such as a battery source into an AC signal.

The simplest method of converting a DC power source into an AC signal is to alternately switch the DC source on and off. This switching may be accomplished either by a simple mechanical vibrator type switch or by electronic equipment. The result is however the generation of a substantially square wave AC signal.

The switching action is generally accomplished at a relatively low power level, and the subsequently generated AC signal is then amplified and then coupled through a high powered transformer to a load circuit. Depending upon the needs of the load, the output signal may be a substantially square wave signal or means may be provided for filtering the square wave signal and removing some of the higher harmonics. However, since the AC frequency required at the load may be in the order of 60 cycles per second, for instance, the transformer and filter networks required to increase the magnitude of the AC signal and to remove the undesirable harmonics therefrom tend to be heavy, cumbersome, and generally inefficient. The introduction of transistors in the inverter field has greatly reduced the cost, efficiency and performance of inverters and have greatly increased their utility as both standby and primary power sources. However, the size and inefficiency of the associated power transformers and filters have greatly hampered the advances made by the introduction of solid state devices into the static inverter field.

Accordingly, it is a principal object of this invention to provide a high efficiency, high performance static inverter.

It is also an object of this invention to provide a static inverter having a novel means for reducing the size and increasing the effectiveness of associated power transformers and for improving the quality of the AC output signal.

It is another object of this invention to provide a static inverter wherein a high frequency carrier signal is used to improve the efficiency of associated power transformers and wherein the high frequency carrier is low frequency modulated to produce the desired low frequency signal at the output load.

It is another object of this invention to provide a phase angle modulation static inverter having a novel means for modulating a high frequency rectangular pulse train and having an improved switching technique for reconstructing the modulation signal from the modulated pulse train.

It is an additional object of this invention to provide a high frequency modulation static inverter which operates entirely in the switching mode.

It is also an object of this invention to provide a static inverter wherein a high frequency carrier signal is phase modulated and algebraically summed with an unmodulated carrier signal and wherein the combined signal is rectified and alternately and selectively switched to a load circuit and wherein the ultimate switching of the rectified signal is controlled by the direction of current in the load.

These and other objects, features and advantages of the present invention will be understood from the following description and the associated drawings wherein reference numerals are utilized in designating an illustrative embodiment and wherein:

FIGURE 1 is a partial schematic and partial block diagram of a phase modulated static inverter of this invention for showing, in particular, the novel switching means for rectifying and for controlling the switching of the rectified signal to the load in response to the direction of current within the load;

FIGURE 2 is a block diagram illustrating in greater detail a portion of the static inverter circuit shown in FIGURE 1;

FIGURE 3 is a series of diagrams showing the voltage and current waveforms at various circuit points in the schematic of FIGURE 1;

FIGURE 4 is a means for demodulating the pulse modulated AC signal, and

FIGURE 5 is a series of diagrams for illustrating the operation of the circuit shown in FIGURE 4.

This invention concerns generally a novel means for increasing the efficiency of a static inverter and for improving the quality of the output AC signal. In the preferred embodiment of this invention a substantially square wave repetitive signal is phase angle modulated by a low frequency sinewave oscillator. The modulated pulse train is then added to an unmodulated pulse train of the same frequency. When the resulting signal is rectified and properly alternately switched relative to a load, the result is a pulse width modulated signal which contains, with great precision, the information of the original low frequency sinewave oscillator. This improved result is made possible by a novel switching circuit which is both simple, lightweight and efficient. Through the use of this switching circuit, the high frequency modulation is achieved and accordingly the size of the associated power transformers and output filter networks may be substantially reduced in both weight and cost.

Referring to the drawings in greater detail, the static inverter shown in FIGURE 1 employs a logic circuit 10 which has first and second outputs 11 and 12. Each of these outputs are fed to separate power amplifiers such as the amplifiers 13 and 14. The input power supply for the amplifiers is designated generally by the input terminal 15.

The output voltages of the logic circuit 10 are designated as $E_1$ and $E_2$ in FIGURE 1 and are shown in FIGURE 3 as comprising first and second substantially square wave repetitive voltage signals. The logic circuit output $E_1$ is a square wave repetitive signal such as may be derived from an electronic switching device or the like, and the logic circuit output $E_2$ is a square wave voltage signal having the same frequency as the voltage signal $E_1$ but which is phase shifted in accordance with a low frequency sinewave signal. It will be noted that on the average the voltage signal $E_2$ has as many positive going portions as many negative going portions per unit of time as the voltage $E_1$, however, the voltage $E_2$ has positive going and negative going portions which have varying widths to reflect the phase angle distortion produced by the sinewave modulating signal.

In FIGURE 1, the outputs of the power amplifiers 13 and 14 are connected directly to primary windings 15 and 16 of high power transformers 17 and 18. Each of the transformers 17 and 18 has two secondary windings. Namely, the transformer 17 has a secondary winding 19 and a secondary winding 20, and the transformer 18 has a secondary winding 21 and a further secondary winding 22.

The secondary winding 19 of the transformer 17 is connected in series with the secondary winding 21 of the transformer 18. Due to the polarity of the windings, as shown in FIGURE 1, the output of the series combination of the windings 19 and 21 as found across the terminals 24 and 25 will be the algebraic sum of the instantaneous voltages appearing at the primary windings 15 and 16. Of course, the magnitude of the output voltage at the terminals 24 and 25 will depend upon the turns ratio of the various transformers. However, the important consideration is that due to the arrangement of the windings 19 and 21, the voltage signal appearing at the primary 15 as reflected to the secondary 19 will be added with the phase shifted voltage signal appearing at the primary winding 16 as reflected to the secondary winding 21.

It will be noted that the secondary winding 20 and the secondary winding 22 are also connected in series such that the output voltage between the terminals 24 and 26 will also be the algebraic sum of the voltages appearing at the primary windings 15 and 16 as reflected through the respective transformers. Also, the series combination of the secondary windings 19 and 21 and the series combination of the secondary windings 20 and 22 are, in turn, connected in series with one another such that the secondary windings 19, 21, 20 and 22 form a continuous series combination. Due to this arrangement, the circuit junction point 24 effectively becomes a center tap for a transformer secondary which has a voltage appearing on both sides of the center tap which is the algebraic summation of the input voltage signals of the separate transformers. In this way, the algebraic sum of the voltages $E_1$ and $E_2$ is divided into a positive appearing and negative appearing component.

The algebraic sum of the voltages $E_1$ and $E_2$ is shown as $E_3$ in FIGURE 3 and is found positively at the terminal 25 relative to the terminal 24 and negatively at the terminal 26 relative to the terminal 24.

The voltage waveform $E_3$ has the low frequency sinusoidal information therein but $E_3$ appears to the transformers 17 and 18 to be a high frequency oscillating signal. Accordingly, as is well understood, the transformers 17 and 18 can be substantially reduced in size while maintaining improved effectiveness over transformers which would be required if the voltage signal $E_3$ contained only the low frequency sinusoidal information. However, the sinusoidal information is the information which is ultimately to be delivered to the load, and accordingly means must be provided for reconstructing the switching mode representation of that sinusoidal signal.

Such reconstruction means are shown in FIGURE 1 in the form of two sets of rectifiers and two demodulation switching devices. The first set of rectifiers consists of diodes 27 and 28 which are connected from the terminals 25 and 26, respectively, to a common terminal 29. The second rectifier set comprises diodes 30 and 31 which are connected from the terminals 25 and 26 to a common terminal 32.

The switching devices which are used to reconstruct the sinusoidal signal are transistors 33 and 34. The transistor 33 has its collector 35 connected to the terminal 29 intermediate the diodes 27 and 28 and has its emitter connected to a terminal 37. The transistor 34 has its emitter 38 connected to the common terminal 32 intermediate the diodes 30 and 31 and has its collector 39 connected to the terminal 37.

The load circuit as shown in FIGURE 1 comprises a load 40 and a filter network 41. This load circuit is connected through a line 42 to the terminal 37 intermediate the transistors 33 and 34 and through a line 43 to the center tap 24 of the secondary windings associated with the transformers 17 and 18.

It is apparent from considering FIGURE 1, that when the transistor 33, for instance, is conducting, the positive-going portions 44, 45 and 46 of the algebraic summation waveform $E_3$ wil conduct through the diode 27 and the transistor 33 to the load 40. Also, the negative-going portions 47, 48 and 49, for instance, of the voltage waveform $E_3$ will pass through the diode 28 and the transistor 33 to the load 40. When either one of the diodes 27 or 28 is conducting, the other diode will be in a nonconducting state, resulting in the full wave rectification of the signal $E_3$ such as is shown in waveform $E_4$ as at 50, 51, 52 and 53. Similarly, when the transistor 34 is placed in a conducting state, negative-going portions of the waveform $E_3$ such as the portions 54, 55 and 56 will conduct through the diode 30 and the transistor 34 to the load 40, and positive-going portions 57, 58 and 59 will conduct through the diode 31 and the transistor 34 to the load 40. The result is a full wave rectified negative signal such as is shown at 60, 61, 62 and 63. Hence, conduction of either transistor 33 or 34 will result in a full wave rectified signal. However, the rectified signal for conduction of the transistor 33 will be a positive-going signal, while the rectified signal for conduction of the transistor 34 will be a negative-going signal. Also, it will be noted that the voltage waveform $E_4$ is a pulse width modulated signal which contains the original modulating sinusoidal information and wherein the width of each succeeding pulse reflects the amplitude of the sinusoidal signal during that particular time interval.

However, if the original sinusoidal signal is to be reconstructed, means must be provided for selectively and alternately switching the transistor 33 and the transistor 34 to an on and off condition. Such a means is provided through the use of a current sensing circuit 64 which utilizes a transformer 65 having a primary winding 66 connected in series with the load circuit and a secondary winding 67 connected directly to the current sensing circuit 64. The output of the current sensing circuit is connected through lines 68 and 69 to the base 70 and to the base 71 of the transistors 33 and 34, respectively. Essentially, the current sensing circuit provides a positive biasing voltage at the base 70 of the transistor 33 when current $I_1$ in the output circuit is positive. When current $I_1$ is negative, the current sensing circuit 61 then provides the proper biasing signal for turning on the transistor 34 and turning off the transistor 33. In this way, the transistors 33 and 34 are turned on and off alternately and selectively in such a way as to accommodate the direction of the current $I_1$ within the load 40. This allows the inverter circuit to accommodate both leading and lagging power factor loads and to properly switch the transistors 33 and 34 when the load current requires reversing. Due to the switching action described, the filter network 41 will recover the original sinusoidal information from the voltage waveform $E_4$ as shown in FIGURE 3 and develop the waveform $E_5$ in a well understood manner. Likewise, the current waveform $I_1$ as shown in FIGURE 3 will be recovered from the pulse modulated signal $E_4$. However, it will be noted that the phase of the voltage waveform $E_5$ as indicated at 72 may be significantly different from the phase of the current waveform $I_1$ as indicated at 73. However, through the use of the current sensing circuit 64, the transistors 33 and 34 will switch alternately at the current zero phase points 73 as described.

In FIGURE 1, the current sensing network will only turn the associated transistor into an on-state when a current is detected in the primary winding 66 of the transformer 65. Accordingly, when the static inverter is placed into operation initially, means must be provided for triggering one or the other of the transistors 33 and 34 into an on-condition. Such a means is provided in the form of a initial condition circuit 74 which may be any suitable device for beginning operation of the switching action. Once started, the current sensing network will take over the switching function for maintaining a proper switching relationship with the load current $I_1$.

By way of example, the logic circuit 10 shown in FIGURE 1 may consist of a high frequency squarewave oscillator 75 which is connected directly to the power amplifier or squarewave power stage 13. The output of the oscillator 75 is tapped as at 76 and fed to a phase shifter 77 which, in turn, is connected to the second power amplifier or squarewave power stage 14. The phase shifter 77 is actuated by a modulating circuit consisting of an oscillator 78 and an absolute value circuit 79 for phase angle shifting the high frequency squarewave signal. The initial condition circuit 74 may consist of a squaring or shaping circuit 79a which is connected to the output of the sinewave oscillator 78 and which is connected to a demodulation drive 80 for switching the indicated transistors 33 and 34.

Another desirable means for accomplishing the demodulation required is shown in FIGURE 4. In FIGURE 4 the secondary windings 19 and 21 of the power transformer are connected in series with a full wave rectifier 81. Likewise, the secondary windings 20 and 22 are connected in series with a full wave rectifier 82. The rectifiers 81 and 82 are connected together at a common point 83 and are both grounded through a filter network 84 to a circuit point 85.

The full wave rectifier 81 comprises diodes 86, 87, 88 and 89 connected in a well understood manner to achieve full wave rectification. A transistor 90 is connected between the circuit junction points 91 and 92 within the rectifier 81 to achieve the switching action desired to accomplish the demodulation. To accomplish this switching action, the transistor 90 has a base 93 which may be connected to one outlet 94 of the demodulation drive 80 shown in FIGURE 2.

Likewise, the rectifier 82 has four diodes 94, 95, 96 and 97 connected as in the case of the rectifier 81 with a transistor 98 connected between circuit junction points 99 and 100 to accomplish the rectification and switching action explained above. In this connection, the transistor 98 has a base 101 which may be connected to a second output 102 of the demodulation drive 80.

Both of the rectifiers 81 and 82 conduct from the junction point 83 through the filter network 84 to the junction point 85. In this way, the rectified and switched high frequency pulses associated with the secondaries 19 and 21 and 20 and 22, respectively, are filtered to recover the low frequency modulation waveform. The filter network 84 consists in particular of an inductor 102 and a capacitor 103 having magnitudes and being connected in a well understood manner to achieve the desired filtering effect. The output of the filter network may be taken at a terminal 104 provided intermediate the inductor 102 and the capacitor 103.

As explained in conjunction with FIGURES 2 and 3, the voltage appearing across the primary 16 of FIGURE 4 will be simply a high frequency squarewave signal as shown at $E_1$ of FIGURE 3. Also, the voltage appearing across the primary 15 will be a similar high frequency squarewave signal which is phase shifted as shown at $E_2$ in FIGURE 3. Because of the series connections of the secondaries 19 and 21 as well as the secondaries 20 and 22, the voltage waveforms $E_1$ and $E_2$ will be added such that the voltage appearing at the circuit point 105 in FIGURE 4, for instance, is approximated by the voltage waveform 106 shown in FIGURE 5. It will be noted that the secondaries 19 and 21 are wound in the opposite sense to the windings 20 and 22 such that the voltage appearing at the circuit junction point 107 will be the negative of the voltage waveform 106. This waveform is shown at 108 in FIGURE 5.

It is apparent that by controlling the proper switching of the transistors 90 and 98, the voltage waveforms 106 and 108 can be combined to produce a rectified pulse modulation signal which is alternately positively and negatively rectified in accordance with the original low frequency modulation signal.

The rectification is accomplished by switching the transistor 90 into its on state when the junction point 105 is of a certain polarity and by switching the transistor 98 into an on state when the junction point 107 will be same polarity. Of course, the junction point 107 will be of the same polarity only for alternate pulses. Therefore, the rectifier 81 will conduct for one pulse and be turned off for the second pulse while the rectifier 82 will be turned off for the first pulse and conduct for the second pulse. For instance, if the transistor 90 is caused to conduct everytime the pulse appearing at the point 105 is negative, and likewise the transistor 98 is caused to conduct whenever a negative pulse appears at the junction point 107, full rectification will be achieved within the filter network 84.

However, the transistors 90 and 98 must be caused to conduct not only for alternate pulses, but the polarity of those pulses during which conduction occurs, must be alternately reversed in accordance with the original modulation signal. For instance, the switching time of the transistors 90 and 98 may be shown by the voltage waveforms 109 and 110, respectively.

When the voltage waveform 109 is positive as at points 111 and 112, the transistor 90 will conduct during times 113 and 114 which means that the negative pulses 115 and 116 will be fed to the filter 84. Likewise, when the voltage waveform 110 is positive as at points 117 and 118, the transistor 98 will conduct during times 119 and 120 which means that negative pulses 121 and 122 will be fed to the filter network 84. The result is the rectified waveform consisting of the pulses 121, 115, 122 and 116. This may be said to be negative rectification.

However, at time 123 it becomes necessary to switch to positive rectification in order to recover the original AC demodulated signal. Accordingly, the gating signals must be reversed. Hence, a positive pulse appears at the voltage waveform 109 at point 124 where a negative pulse would otherwise appear where the previous sequence of positive and negative pulses follow. Similarly, a negative pulse appears at the point 125 in the voltage waveform 110 where a positive pulse would otherwise have appeared. The result is that the positive signals 126, 127, 128, 129 and 130 are gated from the voltage waveform 106 by the transistor 90, while the pulses 131, 132, 133 and 134 are gated by the transistor 98 to the filter network 84. The summation of these gated signals are shown as pulses 135 through 143. When the summation pulse signal is fed through the filter network 84, the original modulation low frequency signal such as the voltage $E_5$ shown in FIGURE 3 is recovered.

We claim:
1. A static inverter signal means comprising,
   a relatively high frequency generator,
   phase shift means connected to said high frequency generator to phase shift a portion of the output of said generator,
   summing means attached to the generator and the phase shifter for adding the output of the generator and phase shifter,
   rectifying means connected to the summing means,
   demodulating means connected to the rectifying means,
   means for applying the output of the demodulating means to a load,
   the demodulating means comprising means for selectively switching portions of said rectified summation signal alternately positively and negatively at a frequency substantially lower than the frequency of said high frequency generator, and
   means for filtering the high frequency components from the selectively switched summation signal.

2. A static inverter in accordance with claim 1 wherein said means for selectively switching portions of said rectified summation signal alternately positively and negatively comprises a switching means for alternately positively and negatively connecting the rectified summation signal across the load and a current sensing circuit for sensing the direction of current within the load and for triggering the switching means to accommodate changes in current within the load.

3. A static inverter comprising,
   a high frequency generator,
   a phase shifter receiving a portion of the output of said high frequency generator and phase shifting it in response to a low frequency modulation signal,
   adding means connected to the output of the high frequency generator and the phase shifter to produce a summation signal, and
   means for dividing the algebraic summation signal into a negative going and a positive going component,
   first switching means for switching the negative going component to a load, second switching means for switching the positive going component to the load, and means for selectively and alternately triggering the first and second switching means at a relatively low frequency rate.

4. A static inverter in accordance with claim 3 wherein the triggering frequency of said first and second switching means is substantially equal to the modulation frequency of the phase shifting modulation signal.

5. A static inverter in accordance with claim 4 wherein a current sensing circuit is provided for determining the direction of current in the load and wherein the triggering times of said first and second switching means are determined by said current sensing means in accordance with the direction of current in the load.

6. A static inverter comprising: a logic circuit having first and second relatively high frequency output signals, transformer means, said first and second high frequency output signals being connected to the input of said transformer means, the output of said transformer means comprising the algebraic sum of said first and second high frequency outputs, first and second circuits each including a common load a rectifier means and the output of the transformer means, the output of said transformer means being connected in said first circuit to drive current through the common load in a first direction, the output of said transformer means being connected in said second circuit to drive current through the common load in a second direction, static switching means in each of said first and second circuits, and means for alternately and selectively triggering said first and second switching means at a substantially lower frequency than the frequency of said logic output signals.

7. A static inverter in accordance with claim 6 wherein said transformer means comprises: first and second transformers each having a primary and two secondary windings, the first and second outputs of said logic circuit being connected respectively to the primary windings of the first and second transformers, a first secondary of the first transformer being serially connected with the first secondary of the second transformer, a second secondary of the first transformer being serially connected with the second secondary of the second transformer, and the series combination of the first secondaries connected to the series combination of the second secondaries so as to provide a summation of the outputs of the logic circuit on both sides of center taps of the secondaries of said first and second transformers.

8. A static inverter in accordance with claim 6 wherein a filter network is connected in series with the load to eliminate the relatively high frequency components from the selectively switched load signal.

9. A static inverter in accordance with claim 6 wherein said means for alternately and selectively triggering said first and second switching means comprises means for sensing the direction of current at the load and for triggering the first and second switching means in accordance with the load current direction thereby accommodating leading and lagging power factor load.

10. A static inverter according to claim 6 wherein said logic circuit comprises a square wave generator of a relatively high frequency, a phase shifter connected to the square wave generator and phase shifting a portion of its output in accordance with a modulation signal, the output of said generator comprising said first relatively high frequency output signal, and the output of said phase shifter comprising said second relatively high frequency output signal.

11. A static inverter comprising: means for developing a first high frequency squarewave signal, means for developing a second high frequency squarewave signal phase shifted relative to said first high frequency signal in accordance with a low frequency modulation signal, means for algebraically summing said first high frequency signal and said second phase shifted signal, an AC demodulator having first and second inputs, means for feeding the algebraic summation signal into one of said inputs, means for feeding the negative of the algebraic summation signal into the other of said inputs, each of said inputs having a full wave rectifier means associated therewith for rectifying the associated input signal, gating means associated with each of said inputs for gating the input signal through the associated rectifier means, means for alternately closing the gate of each of said gating means, means for periodically reversing the closing and opening sequence of the respective gating means in accordance with said modulation signal, and averaging means for recovering the modulation signal from the gated rectifier outputs.

12. A static inverter in accordance with claim 11 wherein said means for algebraically summing said first high frequency signal and said second phase shifted signal comprises first and second transformers associated respectively with the first and second signals each having two secondary windings, each secondary of the first transformer connected in series with one secondary of the second transformer, and said series combination being connected positively and negatively to the first and second inputs respectively of the AC demodulator.

13. A static inverter in accordance with claim 12 wherein said gating means comprises a transistor serially connected with the associated rectifier means and wherein the outputs of said rectifier means are connected to a common output and said averaging means comprises a filter network connected to said common output for recovering the low frequency information signal from the high frequency gated signal.

References Cited

UNITED STATES PATENTS

| | | | |
|---|---|---|---|
| 3,155,824 | 11/1964 | Rotier | 329—146 XR |
| 3,162,724 | 12/1964 | Ringelhaan | 178—68 |
| 3,205,424 | 9/1965 | Bates | 321—18 |
| 3,225,209 | 12/1965 | Schuster | 321—45 XR |
| 3,242,262 | 3/1966 | Melas et al. | 325—320 XR |
| 3,297,936 | 1/1967 | Ruch | 321—18 |

LEE T. HIX, *Primary Examiner.*

W. SHOOP, *Assistant Examiner.*

U.S. Cl. X.R.

329—166, 173; 331—23; 332—14